(No Model.) 2 Sheets—Sheet 1.

W. F. STOCKER.
TIME SWITCH FOR SECONDARY BATTERIES.

No. 393,183. Patented Nov. 20, 1888.

WITNESSES:

INVENTOR,
William F. Stocker.
BY
ATTORNEY.

(No Model.) 2 Sheets—Sheet 2.

W. F. STOCKER.
TIME SWITCH FOR SECONDARY BATTERIES.

No. 393,183. Patented Nov. 20, 1888.

WITNESSES:

INVENTOR.
William F. Stocker.
BY
ATTORNEY,

UNITED STATES PATENT OFFICE.

WILLIAM F. STOCKER, OF BURRTON, KANSAS, ASSIGNOR OF ONE-HALF TO WILLIAM OSCAR VAN ARSDALE, OF SAME PLACE.

TIME-SWITCH FOR SECONDARY BATTERIES.

SPECIFICATION forming part of Letters Patent No. 393,183, dated November 20, 1888.

Application filed May 25, 1888. Serial No. 275,085. (No model.)

*To all whom it may concern:*

Be it known that I, WILLIAM F. STOCKER, a citizen of the United States, residing in Burrton, in the county of Harvey and State of Kansas, have invented a certain new and useful Improvement in Electric Time-Switches; and I do hereby declare that the following is a full, clear, and exact description of my invention, such as will enable others skilled in the art to which it appertains to make and use the same.

In systems where electric translating devices—such as lamps or motors—are used, it generally happens that the time of their use is clearly defined between constant limits. For example, a customer may wish to use his electric lamps only between certain hours, or he may have one set of lamps which he wishes to have constantly available, while another set—such as those in a store-window—may be only required for certain hours. The same is true with regard to motors. Moreover, in charging so-called "storage-batteries" the circuit is usually thrown onto the batteries at a certain hour and thrown off at another fixed hour. In such cases an automatic switch which should throw the translating devices into and out of circuit at the proper times would be a desideratum. It is to supply this that the present invention has been made.

I have illustrated my invention in the accompanying drawings, in which—

Figures 1, 2:
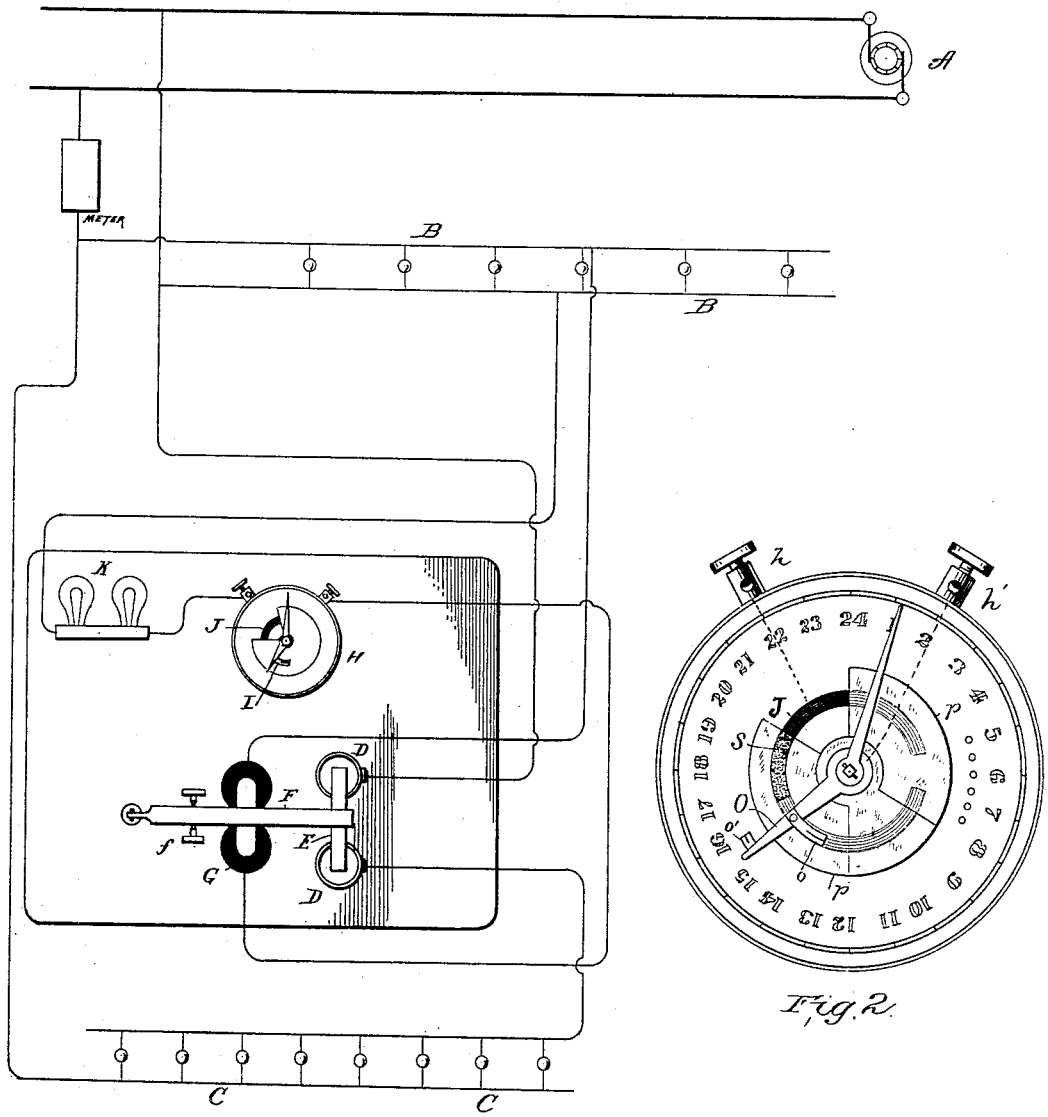
Figure 3:
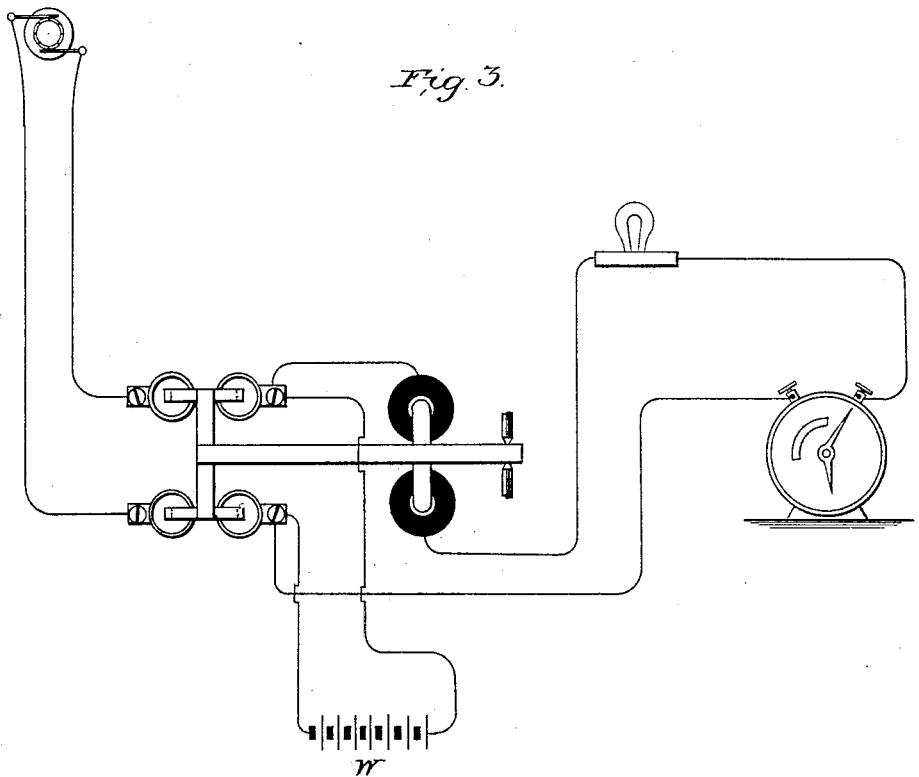

Figure 1 is a diagram of the circuits which I employ for a light system, giving some details of the apparatus. Fig. 2 is a face view of clock apparatus which I use in carrying out my invention. Fig. 3 shows the circuits and apparatus for charging storage-batteries.

Referring to the drawings by letter, A is a dynamo electric machine, in separate derived circuits of which are included translating devices B B and C C. The translating devices in this instance are represented as incandescent electric lamps. In passing to the translating devices the circuit includes a meter of any desired type.

The lamps B B are arranged to be always available. The derived circuit, which includes the lamps C C, includes mercury-cups D D, as shown. The mercury in these cups is, of course, insulated; but the two masses may be electrically joined by a yoke, E, on the end of the armature-lever F of the magnet G. This armature-lever is pivoted at *f*. When the armature of the magnet G is unattracted, the circuit of the lamps C C is broken; but it is closed when the armature is down to the poles. Now the circuit of the magnet G is taken from the two sides of the derived circuit, including the translating devices B B, and this circuit is closed periodically by my time-switch H whenever the clock-moved arm or pointer I comes in contact with the platinum strip J on the dial-face. This circuit is usually closed through one or more incandescent lamps, as K, to reduce the current to the proper strength. Suppose now that the lamps C C are arranged in a store-window and that the proprietor wishes them to be burning from eight to twelve in the evening. By means of devices which will be explained hereinafter the arm I will be in contact with the strip J only between those hours, thereby operating automatically to cut in or out the lamps at the proper times. In this way the work of operating these lamps will be done directly by clock apparatus and without special oversight.

Coming now to the details of the switching apparatus, it consists of a clock-work of any suitable type having a dial-face marked with the hours from 1 to 24. A clock adapted to make the circuit of the dial once in twenty-four hours is preferable, as otherwise the apparatus would do its work once every twelve hours, which, in general, is not desired.

The clock-work shown is provided with two binding-posts, *h* and *h'*, the former of which is connected with a circular strip, J, of platinum, secured to the dial-face and the latter to the clock-work itself or to the hand or hands which traverse the dial. Of course the platinum strip is insulated from the hand or from the clock-work, as the case may be. Usually the dial-face itself will be made of insulating material and the strip secured upon it. In the apparatus which I show I connect with the hour-hand O of the clock a spring strip or follower, *o*, which is adapted to make contact with the platinum strip when not impeded. Between the hands and the dial are half-disks $p$ and $p'$, of mica, which are adjustable in such a manner with respect to each other as to leave just as much or as little of the platinum strip as may be desired exposed. According as these half-disks are adjusted the follower $o$ will remain in contact with the spring $i$ a longer or shorter time. It is evident that by various adjustments the times when the follower shall come in contact with the spring can be varied, as can also the duration of contact. Thus I can cause the follower to complete the circuit by making contact with the strip at four o'clock or six o'clock or eight o'clock or any other hour, and I can maintain the contact to any appointed hour. It is only necessary to adjust the disks, and they will maintain themselves in position by friction or in any other suitable way which might be provided.

It is of course expected that each clock will be adjusted to suit the needs of the person into whose hands it is given, and that thereafter the adjustments will not ordinarily be varied.

I prefer to apply to the inner half-disk of mica a strip, S, of emery-paper arranged in the path of the follower, so as to keep its surface of contact bright. By this means the follower will be brightened every twenty-four hours.

It is evident that the materials—such as the mica—might be altered; but I prefer to use those suggested.

In Fig. 3 I show the circuits for automatically throwing in the secondary battery W by means of my switch. In this case I have two sets of mercury-cups, and my armature-lever supports upon an insulating cross-bar two yokes instead of one. When the circuit is closed at the time-switch, the magnet acts as before and cuts the battery into the circuit of the dynamo. Only so much current is diverted through the magnet as is necessary to hold the armature down. The amount of current in this circuit is regulated by a lamp or lamps, as before.

It is evident that my time-switch may be employed for many other purposes besides those herein mentioned.

Having now described my invention, what I claim is—

1. The combination, with a clock and its dial, of a circular conducting contact terminal on the dial and a corresponding contact-piece connected with the hour-hand, and the mica half-disks adjustable between the two contacts, as and for the purpose set forth.

2. The combination, with a clock and its dial, of a circular conducting contact terminal on the dial and a corresponding contact-piece connected with the hour-hand, and the mica half-disks adjustable between the two contacts and the roughened emery-cloth or its equivalent, as and for the purpose set forth.

3. The combination, with an elongated contact-strip and a regularly-moving contact-brush adapted to move upon said elongated strip, of adjustable non-conducting elements adapted to be interposed between said contacts and into the path of the moving contact to limit the time of the junction between the contacts and to determine upon what portion of said elongated strip the junction shall take place.

4. The combination, with a clock and its dial, of a circular conducting terminal attached to the dial, a corresponding terminal attached to the hour-hand, a pair of adjustable insulating half-disks located between the two contacts, and an electro-magnetic switch controlled by the contact of the said terminals, as and for the purpose set forth.

5. The combination, with a clock and its dial, of a circular conducting terminal attached to the dial, a corresponding terminal attached to the hour-hand, a pair of adjustable half-disks located between the two contacts, and an electro-magnetic switch controlled by the contact of the said terminals, the said switch itself controlling a separate circuit, as and for the purpose set forth.

6. The combination, with a clock and its dial, of a circular conducting-strip attached to the dial and a corresponding contact-piece attached to the hour-hand, and a pair of adjustable half-disks located between the two contacts, as described.

7. Two electric terminals movable with respect to each other, one of said terminals being elongated with respect to the other, and a clock-work for moving one of said terminals, all in combination with a non-conducting element or elements, the said non-conducting element or elements being interposed between said terminals and adjustable, so as to limit or control the position and duration of contact between the terminals.

In witness whereof I have hereunto signed my name in the presence of two subscribing witnesses.

WILLIAM F. STOCKER.

Witnesses:
 WM. A. ROSENBAUM,
 FRANK C. GREEN.